Sept. 7, 1965    R. BROWN    3,205,005
ENERGY-ABSORBING HEADREST FOR MOTOR VEHICLE SEATS
Filed Aug. 10, 1964
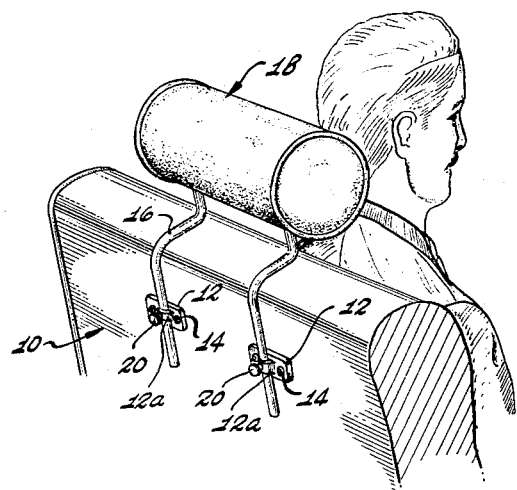
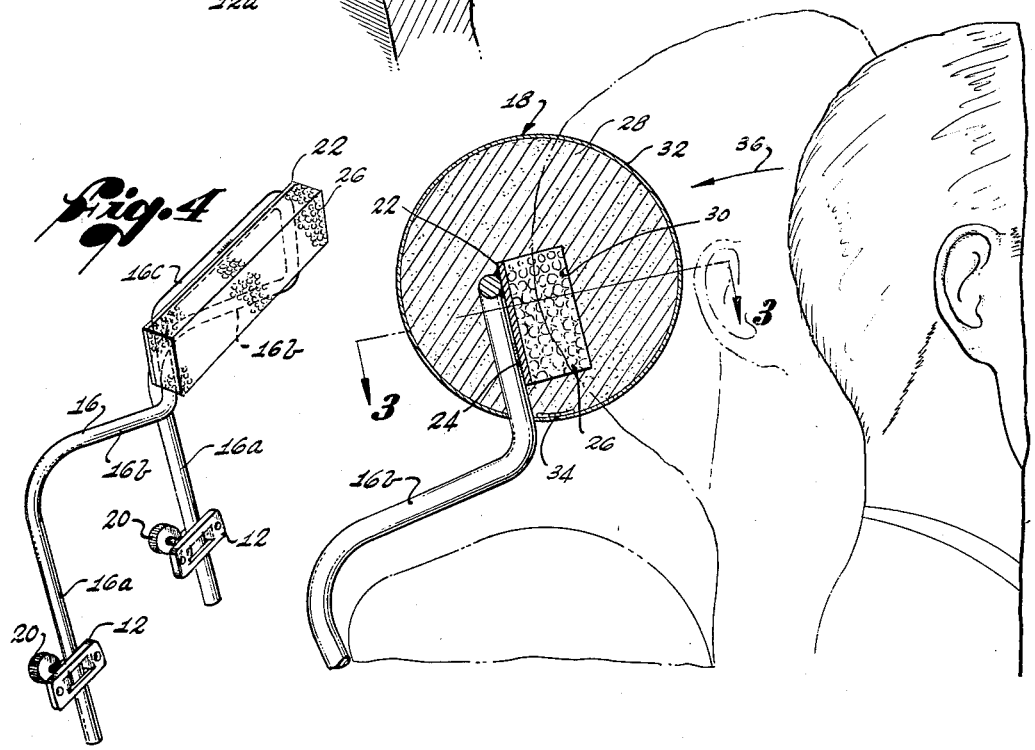
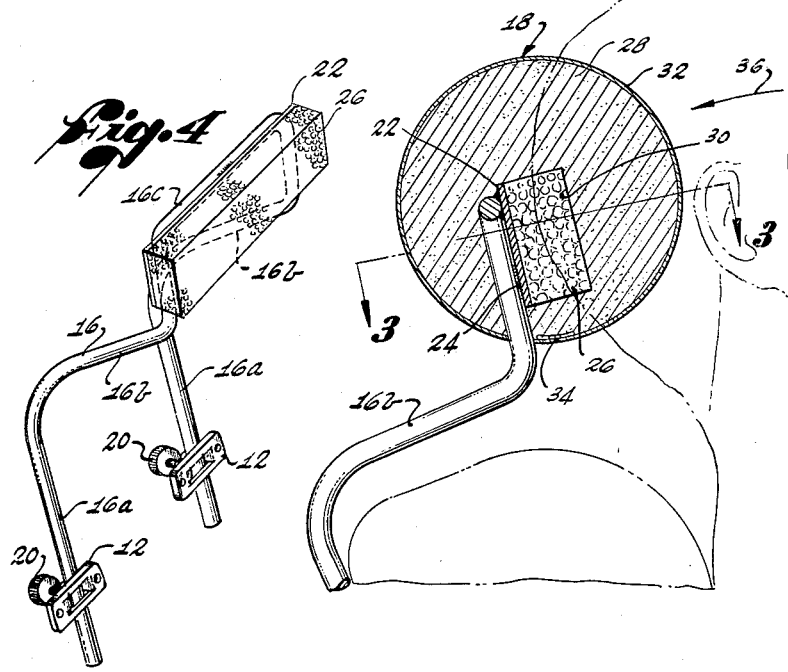
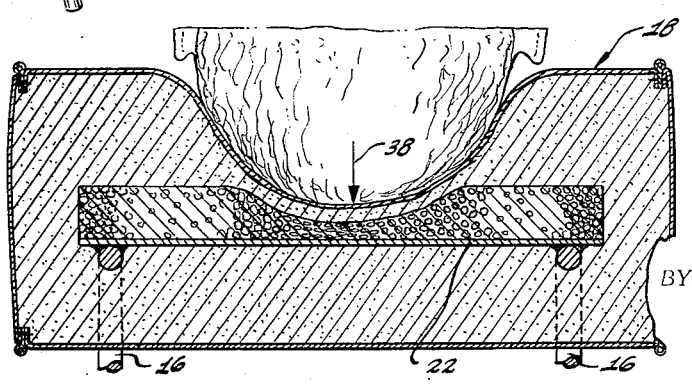
INVENTOR.
RAY BROWN
BY Fulwider, Patton, Rieber, Lee, and Utecht
ATTORNEYS

United States Patent Office 3,205,005
Patented Sept. 7, 1965

3,205,005
ENERGY-ABSORBING HEADREST FOR MOTOR VEHICLE SEATS
Ray Brown, 4545 Noeline Ave., Encino, Calif.
Filed Aug. 10, 1964, Ser. No. 388,473
3 Claims. (Cl. 297—397)

The present invention relates to a head rest which may be secured to or made integrally with the back of a passenger seat to provide protection for the neck or head of the passenger in the event of an accident involving the vehicle containing the seat.

A variety of head rests have heretofore been devised and marketed, particularly for use in automobile passenger seats. Ostensibly, such head rests are adapted to increase the safety of the user, as well as his comfort, by cushioning any impact of the back of the head or neck as a result of an accident in which the passenger vehicle is involved, particularly in the case of the user's vehicle being struck from behind when at a standstill. However, experience has shown previously available head rests to be of very little value as a safety factor. On the contrary, in some cases these devices have accentuated the hazards involved by acting as a recoil mechanism or because the rigid framework behind or within the head rest cushion provides a relatively immovable obstacle or pivot axis against which portions of the head or neck are smashed or turned.

In general, the popular types of previously available head rests have a cushion of a highly elastic or resilient material mounted on or around a framework that, in turn, is attached to the passenger seat by means of brackets. Customarily, the device is adjustable fore and aft and vertically, whereby the head rest cushion may be positioned for comfortable contact with the head or the neck, or both. The resilient material of the head rest cushion is very readily compressible so that upon opposed relative movement of the head and head rest during an accident, the resilient material very quickly becomes totally compressed. Thereafter, the head or neck comes into contact with the rigid supporting structure for the cushion, which is usually a metal strap or bar, which gives a forceful impact to the head and may also serve to pivot and accelerate the head. Thus, although the head has been stopped to minimize the overall amplitude of the whiplash motion, injury to the head or neck has already occurred. Then, the energy accumulated in the compressed resilient cushion material acts as a recoil mechanism, accelerating the head forwardly, thus completing the whip-lash motion with additional injury.

An object of this invention is to provide a head rest for a passenger seat that will decelerate and absorb the energy of a head moving relatively rearwardly against the head rest, but without accumulating such energy as will effect injurious recoil of the head forwardly again.

A further object of the invention is to provide a head rest for a passenger seat that will limit relative rearward movement of the passenger's head to accordingly limit the amplitude of a whip-lash motion, but at the same time, will prevent injurious contact between the head or neck of the passenger and the supporting structure of the head rest.

Yet, another object of the invention is to provide a passenger head rest adapted to absorb the major portion of the kinetic energy of a relatively rearwardly moving head in cases of accident, but yet will provide the desired comfort characteristics of a head rest.

These and other objects and advantages of the invention will be apparent from the following description of one embodiment of the invention:

FIGURE 1 is a perspective view of a presently preferred embodiment of the invention attached to the rear of a passenger's seat with a head rest cushion in position for providing support to the passenger.

FIGURE 2 is a sectional view, taken on a vertical plane through the head rest illustrated in FIGURE 1, showing internal features of construction and also showing, in phantom outline, the positional relationship of the internal parts of the head rest to the passenger's head on a forceful impact.

FIGURE 3 is a sectional view taken on the plane of the line 3—3 of FIGURE 2, but with a head of the passenger illustrated as substantially fully compressing the internal parts of the head rest structure.

FIGURE 4 is a perspective view of the head rest frame and the energy absorbing core thereon, the head rest cushion having been removed for clarity of illustration.

In the drawing, the head rest is illustrated as being especially adapted for use in an automobile passenger's seat. However, it is to be understood that the invention is not limited to this particular environment and is of utility in other passenger seats as, for example, aircraft, buses, boats, passenger trains, amusement park rides or in any other situation in which the passenger vehicle may be subjected to an impact of the type that may develop into injurious motion of the head or neck of the passenger. Further, the head rest may be integrated into the seat frame, rather than being in the form of an accessory, as in the drawing.

Referring to the drawing and, in particular, to FIGURE 1, there is shown an automobile passenger seat 10. The internal details of construction of the seat are not shown, but such seats customarily have a rigid internal framework which supplies anchor points for a pair of brackets 12 that are secured to the seat framework by means of a pair of suitable fasteners 14. These brackets serve to adjustably support a head rest frame 16 at the lower end of the frame, the upper end of the frame supporting a head rest assembly designated generally at 18. This generally arrangement is conventional and, as illustrated in FIGURE 1, serves to position a head rest immediately above the upper edge of the passenger seat 10 in the proper relationship to the head and neck of the user occupying the seat.

More particularly, the frame 16 is preferably made from a single length of a steel rod that is bent into the configuration best seen in FIGURE 4. Thus, the frame or rod 16 is formed at both sides with straight terminal portions 16a that are generally vertically disposed and whose upper ends are forwardly bent into substantially horizontally disposed portions 16b, the two opposite sides of the frame thus being of generall inverted L-shaped configuration. These opposite portions of the frame are joined together by an intermediate portion 16c of inverted U-shaped configuration. In order to hold the frame on the passenger's seat 10, each bracket 12 has an integrally formed half-loop portion 12a struck out of the body of the bracket, through which loops the terminal portions 16a of the frame are slidably received. The loop portions 12a are centrally provided with a tapped bore adapted to receive a thumb screw 20, by means of which the frame 16 and the head rest assembly 18 are securely held in a desired, vertically adjusted postition.

A metal plate 22 of substantial frontal area (here of rectangular configuration) is securely affixed, as by welding 24, to the forward or front side of the U-shaped mid-portion 16c of the frame 16. This plate serves as a relatively rigid base for an energy absorbing core 26 of the head rest assembly 18. As shown in FIGURE 4, the core 26 takes the form of a rectangular block that is large enough to cover the front face of the plate 22, to which it may be secured by any appropriate means as, for example, by a suitable adhesive. The energy absorbing core 26 should be made of a compressible but inelastic or substantially non-resilient material, yet should not be so readily compressible as to allow the head to react against the plate 22 or the supporting frame 16 without absorbing a substantial amount of the kinetic energy by a permanent deformation of the energy-absorbing core. Forces of 20–30 g are common in severe auto accidents, but if the energy-absorbing core 26 is made to absorb a force of 100 pounds before allowing a head of 9–11 pounds to substantially fully compress the core against the plate 22, this should be sufficient for all practical purposes since loads in excess of that may tear out the seats of vehicles unless the seats are crashworthy. In the particular embodiment illustrated, the core 26 is made of substantially inelastic synthetic plastic, such as expanded polyestyrene having a thickness of approximately one inch, in a density sufficient to absorb the energy of a 100-pound impact of the head before full compression of the core and permanent deformation of the frame occur. It is believed that approximately this capacity of the core 26 is sufficient in present day passenger automobiles, which do not have crashworthy seats. However, it is to be under stood that cores of greater or less energy-absorbing capacity may be utilized, depending upon the environment of usage of the head rest of this invention and the desired safety factor.

Referring to FIGURE 2, the energy-absorbing core and the upper portion of the framework 16 are frontally covered, at least, by a soft material, for example, a cylindroidal roll of a resilient foam material providing for head rest cushion 28. Preferably, although not necessarily, an opening 30 is cut into the cushions 28 of a size to snugly receive the core 26 in or near the approximate center of the cushion 28. A cylindrical cover 32 encases the cushion 28 and may be provided with a longitudinally extending zipper 34, preferably located at the bottom of the cushion, whereby the cover may be removed either for replacement of the cover or in order to gain access to the interior of the head rest assembly 18 for repair or replacement purposes.

The cushion 28 may be made of a variety of materials. Polyurethane foam is utilized in the presently preferred embodiment of the invention, since it is comfortable but yet will compress readily, requiring only about 5 to 10 pounds of pressure of the head distributed over the area of contact in order to depress the elastic foam sufficiently to the point where energy is transmitted to the core 26, in a head rest assembly 18 of the size illustrated. Thus, referring to FIGURE 2, approximately an inch and a half of polyurethane foam covers the front face of the energy-absorbing core 26. This amount of the material can very readily be compressed by a pressure of 5 to 10 pounds. This is sufficient to give comfort to the user, but yet does not result in a sufficient accumulation of elastic energy in the compressed foam to be a significant factor in effecting a recoil movement of the head.

The cushion 28 may, of course, be made of other materials and, in fact, of any material which will comfortably cushion the head, whether or not the material is elastic. Thus, air cushions may be employed or rubberized hair, or synthetic foam rubber, but, in any event, the nature and thickness of the cushion material used, if any, should be such that under any severe impact, the head of the passenger will be allowed to come into contact with the energy-absorbing core 26 very quickly, without first effecting significant accumulation of resilient energy in an overlying cushion.

A variety of materials may also be used in lieu of expendable styrene for the energy-absorbing core 26. The core may also be made of other substantially inelastic synthetic plastics, e.g., cellular vinyl, or polyethylene foam, if of sufficiently low density to absorb the desired load or force of impact within the thickness of the material used, for example, a 10 g impact to crush a one inch thick block as in the case of the core 26 illustrated in the drawing. The core may be made larger than illustrated, large enough to be used without any significant amount of cushioning thereover. Natural materials may also be used as, for example, balsa wood.

In the event of an accident, the head rest will efficiently absorb the energy of an impact, will prevent the head from an injurious blow from the supporting framework and will prevent any significant recoil of the head due to any elasticity of the structure. Thus, in FIGURE 2, the arrow 36 illustrates the direction of relative movement of the head towards the head rest as the result of an impact. As the head contacts the area of the foam cushion 28, the cushion is elastically stressed, allowing the head to continue back towards the energy-absorbing core 26. Assuming a 10 g force, the head continues back in and into the core 26 as illustrated by the directional arrow 38 in FIGURE 3, and the core is compressed, being substantially permanently deformed in absorbing the energy of the impact. The core 26, of itself, is not sufficiently strong to withstand the force of an impact of this strength, but is reinforced by the backing plate 22 and, if the bending strength of the plate and the supporting framework are not exceeded, the head will then be arrested from further relative movement. Now, the only energy remaining in the head rest assembly 18 resides in the compressed state of the cushion 28 and is relatively slight so that the recoil does not contribute significantly to any return movement of the head.

While only the presently preferred embodiment of the invention has been described herein, variations of the several details of construction will, undoubtedly, occur to those skilled in the art. Accordingly, it is to be understood that the invention is not limited to the embodiment herein described, but only by the spirit and scope of the following claims.

What is claimed is:

1. In a head rest for a passenger seat, the combination comprising:
   a supporting framework for said head rest adapted to rigidly position said head rest behind the head of a passenger occupying said seat;
   an essentially inelastic, deformable energy-absorbing material on said framework interposed in the path of rearward movement of the head of said passenger and adapted to absorb the impact energy of the passenger's head without rebounding the passenger's head;
   and a rigid means in said framework behind said head rest that is held stationary relative to said seat by said framework for reinforcing said energy-absorbing material against breaking under the impact of said head.

2. A head rest for a passenger seat comprising:
   a rigid framework adapted to be stationarily secured to said seat and having a rigid plate secured thereto rigidly obstructing the path of relative rearward movement of the head of a passenger seated in said seat to restrict the amplitude of movement of the head;
   an energy-absorbing core for said head rest on and substantially covering the front face of said rigid plate, said core being made of a substantially inelastic compressible material;
   and a cushion mounted over the front, at least, of said core, said cushion being made of a material and thickness of material to be sufficiently compressible under the impact of a passenger's head to permit the head to effect inelastic compression of said core, whereby the head is decelerated by said core without consequent recoil from said core.

3. A head rest for a passenger seat comprising:
   a pair of brackets for rigidly connecting a frame for said head rest to the rear of a passenger seat;
   a rigid frame made from a length of metal rod having a pair of terminal portions on opposite sides of the frame that are held in generally vertically disposed positions by said pair of brackets, and having a mid-portion joining said opposite sides of said frame and supported behind and approximately at the level of the head of a passenger occupying a seat to which said bracket and frame are to be attached;

an elongate rigid plate fastened to the front of said mid-portion of said frame in horizontally extending position and in a generally vertically disposed plane to present a frontal area in the path of relative rearward movement of the head of a passenger, said frame and plate being adapted to firmly limit such relative rearward movement of a head;

an energy-absorbing core having a surface sufficiently large to cover and secured to the frontal area of said plate, said core being made of a thickness of inelastically deformable material of sufficiently low density to be compressed against said plate under the impact of the head of a passenger against said core to absorb the energy of the impact;

a cushion mounted over at least the front of said core to normally cushion the head of a passenger against said core during non-emergency use of said head rest, said cushion being made of a resilient material that is sufficiently elastic under the impact of a passenger's head to be compressed against said core without accumulating any substantial energy;

and a cover enclosing said cushion and core.

References Cited by the Examiner

UNITED STATES PATENTS

| | | | |
|---|---|---|---|
| 659,052 | 10/00 | Crenshaw | 297—410 |
| 2,765,840 | 10/56 | Robert et al. | 297—410 |
| 2,949,152 | 8/60 | Hipps et al. | 297—410 |
| 2,973,029 | 2/61 | Schlosstein | 297—391 |
| 3,000,020 | 9/61 | Lombard et al. | 297—452 |
| 3,018,134 | 1/62 | Shiplett et al. | 297—427 |
| 3,043,627 | 7/62 | Torjusen | 297—452 |

FRANK B. SHERRY, *Primary Examiner.*